W. C. BALLMAN.
MINER'S CAP.
APPLICATION FILED MAY 12, 1908.
917,987.
Patented Apr. 13, 1909.
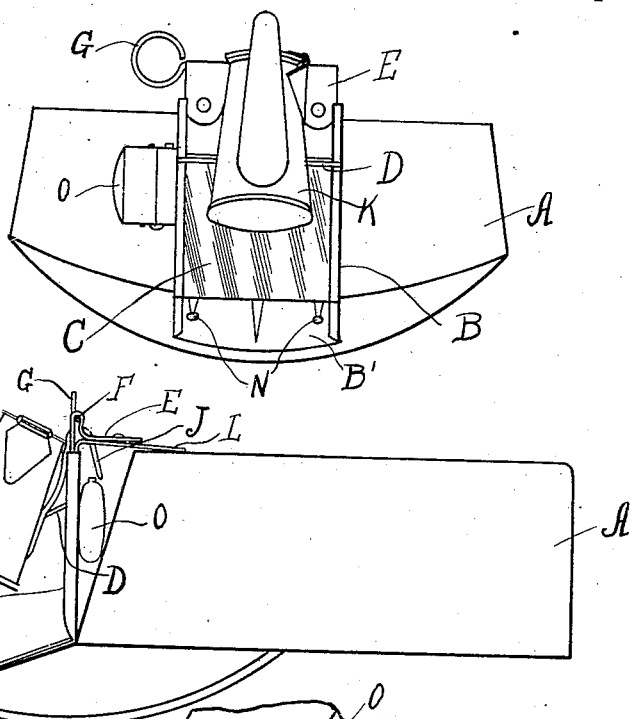
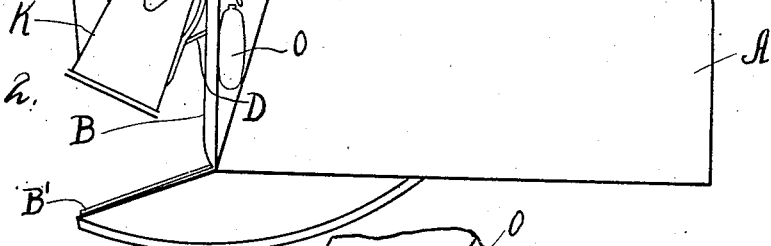
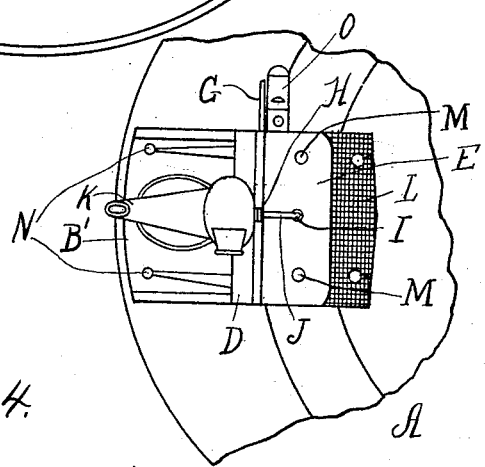
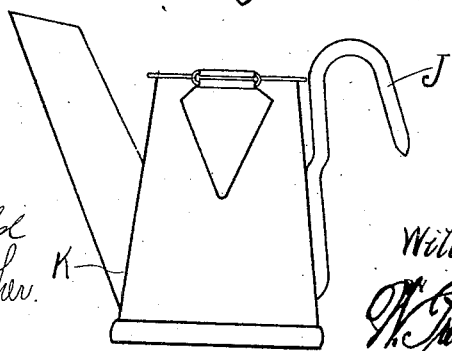
WITNESSES
E. N. Schofield
S. M. Gallagher
INVENTOR
William C. Ballman
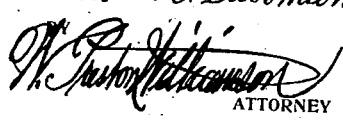
ATTORNEY
THE NORRIS PETERS CO., WASHINGTON, D. C.

UNITED STATES PATENT OFFICE.

WILLIAM CYPHER BALLMAN, OF SIX MILE RUN, PENNSYLVANIA.

MINER'S CAP.

No. 917,987.  Specification of Letters Patent.  Patented April 13, 1909.

Application filed May 12, 1908. Serial No. 432,360.

*To all whom it may concern:*

Be it known that I, WILLIAM C. BALLMAN, a citizen of the United States, residing at Six Mile Run, county of Bedford, and State of Pennsylvania, have invented a certain new and useful Improvement in Miners' Caps, of which the following is a specification.

My invention relates to a new and useful combination in miners' lamps, and has for its object to provide a useful combination of a miner's lamp, mirror and match box, whereby the user is provided with a light and a mirror to enable him to take from the eye particles of dirt which may become lodged therein, in the pursuit of his work, and it also enables him to have matches always dry and ready for use to light if his lamp in any way be blown out.

With these ends in view this invention consists in the details of construction and combination of elements hereinafter set forth and then specifically designated by the claim.

In order that those skilled in the art to which this invention appertains may understand how to make and use the same, I will describe its construction in detail, referring by letter to the accompanying drawing forming a part of this specification in which—

Figure 1 is a front elevation of my improvement applied to a cap. Fig. 2, a side elevation thereof. Fig. 3, a plan view thereof, Fig. 4, an enlarged side elevation of the lamp or torch.

In carrying out my invention as here embodied, A represents an ordinary cap to which my improvement is secured.

B represents the frame of some suitable sheet metal so that the lower end B' may be bent to conform with the peak of the hat. In the said frame B is placed the small mirror C. Above the mirror is secured the shield D which acts both as a shield and a stay for the mirror. To the upper portion of the frame is secured a piece of metal E so bent as to form the elongated loop F for the reception of a pin G, said piece of metal having a slot H and a hole I formed therein for the reception of a hook J which is secured to the lamp or torch K for holding said lamp to the frame. On the other end of the piece of metal E which is secured to the frame is fastened the member L which may be made of paperoid or leather or other suitable material by means of the rivets M.

The rivets N pass through the portion B' for holding my improvement to the peak of the cap. On the back of the frame B is secured the match box O the top of which extends a suitable distance beyond the frame to allow it to be readily opened so that the matches may be readily taken therefrom.

In constructing a device as here shown I take a piece of sheet metal and bend the lower portion of the same to conform with the peak of a cap. Then I place a mirror C in the upper portion thereof and bend the sides of the frame over on said mirror to hold it in place and above the mirror I secure a guard D so that the lamp or torch when in position will rest against this cap thus preventing it from coming in contact with the glass which if it did might break the same, then to the upper portion of the frame I secure a piece of metal E bent to form an elongated loop and on this metal is an opening H and a hole I cut in the same. When a point of the hook J formed on the lamp K is placed in the hole I the other portion of the hook will slide into the opening H, then the pin G is placed in the elongated opening F and in this way holds the lamp in place. The match box O is soldered to the back of the frame B so that the top of the same extends beyond the edge of said frame in order that the catch may be manipulated to open the top so that the user may take a match therefrom.

In practice when a man, such as a miner, gets a particle of dirt in his eye he would take off his cap and place it in such a position that the light will shine upon his face so that he may see the particle of dirt which is lodged in his eye within the mirror, thus he will be able to readily remove the same and should his lamp or torch, from any cause go out he may take a dry match from the box and relight it.

Having thus fully described my invention what I claim as new and useful is—

A miner's cap having a frame the lower end of which is bent to conform to the peak of the cap, a mirror secured thereto, a shield fastened above said mirror a piece of metal having a slot and a hole formed therein bent to form an elongated loop, one end of said piece of metal being secured to the frame and the opposite end being fastened to a piece of paperoid or leather for securing the device to the top of the cap, a lamp or torch having a hook adapted to engage with the slot and hole formed with the piece of metal, a pin adapted to detachably secure the lamp to the piece of metal and a match box secured to the back of the frame, as specified.

In testimony whereof I have hereunto affixed my signature in the presence of two subscribing witnesses.

WILLIAM CYPHER BALLMAN.

Witnesses:
J. L. TENLEY,
H. MYRTLE TENLEY.